April 2, 1968   R. S. KROGSTAD ETAL   3,376,415
X-RAY SPECTROMETER WITH MEANS TO VARY THE SPACING OF THE
ATOMIC PLANES IN THE ANALYZING PIEZOELECTRIC CRYSTAL
Filed Dec. 30, 1964   2 Sheets-Sheet 1
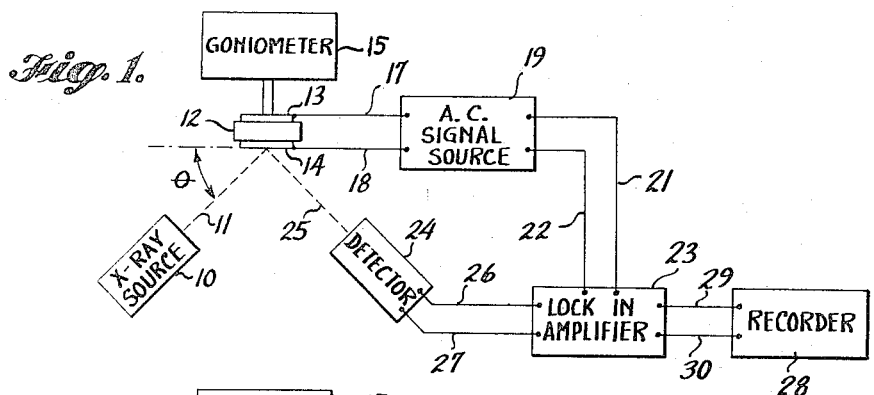
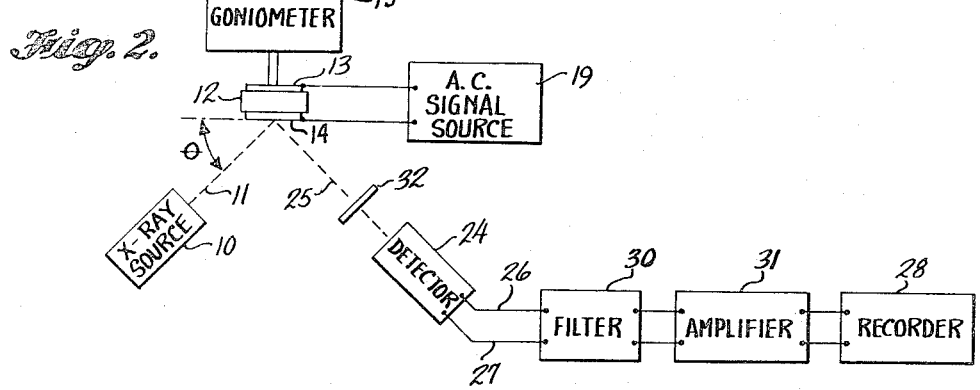
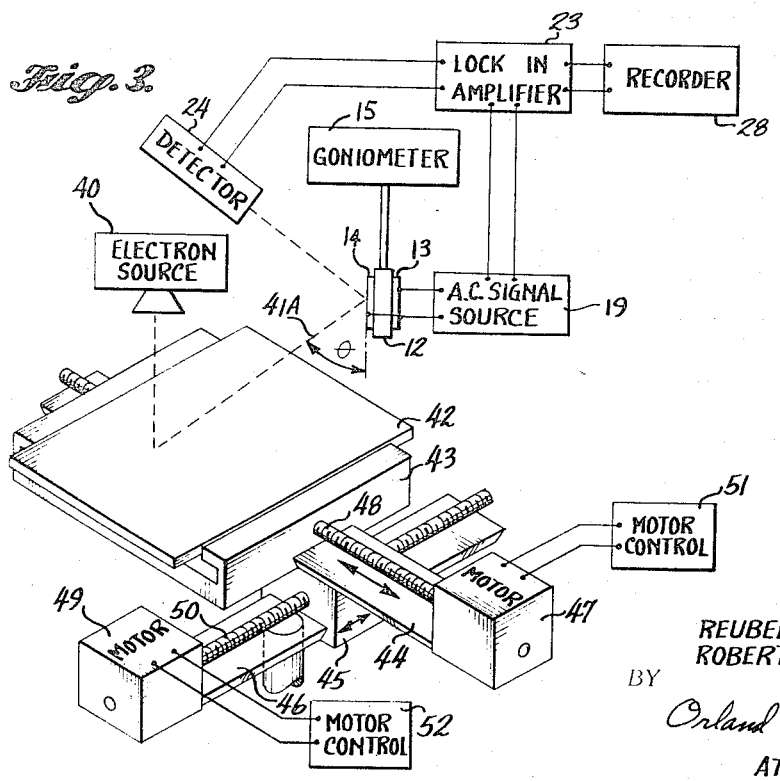
INVENTOR.
REUBEN S. KROGSTAD
ROBERT W. MOSS
BY
Orland M. Christenson
ATTORNEY

United States Patent Office 3,376,415
Patented Apr. 2, 1968

3,376,415
X-RAY SPECTROMETER WITH MEANS TO VARY THE SPACING OF THE ATOMIC PLANES IN THE ANALYZING PIEZOELECTRIC CRYSTAL
Reuben S. Krogstad, Seattle, and Robert W. Moss, Mercer Island, Wash., assignors to The Boeing Company, Seattle, Wash., a corporation of Delaware
Filed Dec. 30, 1964, Ser. No. 422,208
7 Claims. (Cl. 250—51.5)

ABSTRACT OF THE DISCLOSURE

An improved spectrometer is disclosed which uses a crystal excited by a signal source in a manner such that the spacing of the atomic planes within the crystal is varied by the alternating signals. A detector is positioned in the path of the X-rays reflected from the crystal with the output signals from the detector being applied to a frequency sensitive signal output circuit which is controlled by the signal generator serving to vary the spacing of the crystal atomic planes. The arrangement is such that noise problems encountered heretofore in the spectrometer art are greatly reduced and accurate signal information is provided regarding the composition of the target electrode or of material placed in the path of the X-rays reaching the detector. A system for ascertaining the composition of a given surface utilizing the described spectrometer is also disclosed.

---

The present invention relates to X-ray spectrometers and more particularly to an improved and highly sensitive X-ray spectrometer.

High frequency short wavelength electromagnetic radiation commonly referred to as X-radiation is often classified as being of two types, namely the general or "white" X-radiation associated with a continuous spectrum, and characteristic X-radiation which is composed of the various monochromatic rays grouped in series and having wavelengths determined according to the atomic number of the emitting element. It is well known at the present time that by analyzing the characteristic rays emitted by a source of X-radiation the composition of the source can be ascertained. Various types of spectrometers have been devised for various purposes, including the analysis of X-radiation, to determine characteristic wavelengths for identification of the target material used in the X-ray source. Each element not only produces its series of characteristic frequencies when bombarded with electrons but also exhibits a unique absorption characteristic when subjected to X-radiation. Thus it is a common technique to place an unknown material in the path of an X-ray beam and observe the variation in intensity of the transmitted X-rays passing through the material as the wavelength of the irradiating beam is varied, and hence by correlating the occurrence of characteristic absorptions with wavelength ascertain which elements are present.

It is generally found in practice that background noise picked up by the detector presents a problem in accurately identifying the absorption and emission characteristics which are unique for each element. In the case of X-ray emission techniques general or continuous spectrum X-radiation is generated by the source and thus acts as noise when an attempt is made to analyze the characteristic wavelengths. Thus in order to obtain accurate information regarding elements in a given source or in a given medium through which the X-rays pass it is advantageous to have means for discriminating against such noise.

It is therefore an object of the present invention to provide an improved X-ray spectrometer.

It is an additional object of the present invention to provide an X-ray spectrometer having increased sensitivity and the ability to provide improved discrimination against background noise.

Another object of the present invention is to provide an improved apparatus for analyzing characteristic X-radiation intensity patterns.

A further object of the present invention is to provide an improved apparatus for accurately identifying elements in a piece of material.

Another object of the present invention is to provide an ultrasensitive X-ray spectrometer.

An additional object of the present invention is to provide an improved X-ray analysis apparatus for obtaining accurate data regarding the composition of the surface of a specimen.

In accordance with the teachings of the present invention a crystal with variable lattice spacing is supported in the path of a source of X-rays at an angle such that the diffracted X-rays are reflected from the atomic planes in the crystal onto a suitable detector. The crystal is mounted for rotation so that it can be moved to any selected angle with respect to the source of X-rays. Then by observing the intensity of the signals from a suitable detector and using Bragg's well known formula relating frequency to separation between atomic planes in the crystal, information concerning the composition of the X-ray target or of an object in the path of the X-rays can be ascertained. The improved apparatus includes means for applying an alternating signal to the crystal to cause alternating variations in the separation between the reflecting atomic planes. Thus the crystal used may be either piezoelectric or magneto restrictive so that it will respond to appropriate excitation and result in the desired variation in the separation of the atomic planes in the crystal. As a result of the periodic alteration of the separation between atomic planes in the crystal, a very small variation in the wavelength of diffracted X-rays is achieved for each position of the crystal. A lock-in amplifier coupled with the signal generator which energizes the crystal is also coupled with the intensity sensitive X-ray detector positioned for receipt of the reflected X-rays. The lock-in amplifier is sensitive only to detector signals in phase with and at the frequency of the excitation signals applied to the crystal and therefore substantial discrimination against noise is obtained. As described in greater detail hereinafter the amplitude of the lock-in amplifier output signal is zero when the crystal is located at the exact angle corresponding to a peak on the characteristic curve for a given target element and therefore the location of such peak is readily ascertained.

The teachings of the present invention are further applied in a novel system for ascertaining the composition of the surface of a given material. The atoms near the surface of the material to be investigated are excited either with high energy X-rays or by a small diameter beam of electrons in a manner such that some of the atoms in the surface of the material emit their characteristic X-rays and thus make possible accurate identification of the emitting atoms. The crystal of the apparatus first above described is positioned in the path of the emitted X-rays with the crystal being oriented at an angle corresponding to the exact angle for reflection of the emitted X-rays at a selected wavelength corresponding to the characteristic wavelength for a given element. Relative movement is then produced between the source of electrons and the surface of the material with the angle of the crystal with respect to the surface of the material remaining fixed. As relative movement takes place between the beam of electrons and the material under investigation, the crystal will be subjected to X-radiation generated by the material being bombarded by the electrons. Since the separation between atomic planes in the crystal is varied in the manner previously described, noise discrimination is provided and accurate identification of the elements present in the material is obtained.

The above and additional objects and advantages of the present invention will be more clearly understood from the following description when read with reference to the accompanying drawings and wherein, FIGURE 1 is a generalized block diagram showing a preferred embodiment of the improved spectrometer of the present invention;

FIGURE 2 is a further embodiment of the present invention similar to that shown in FIGURE 1 and including as part of the system a band-pass filter network in combination with an output amplifier;

FIGURE 3 is a block diagram and partial isometric view of an embodiment of the present invention adapted for investigating the composition of the surface of a specimen;

Figure 4A:
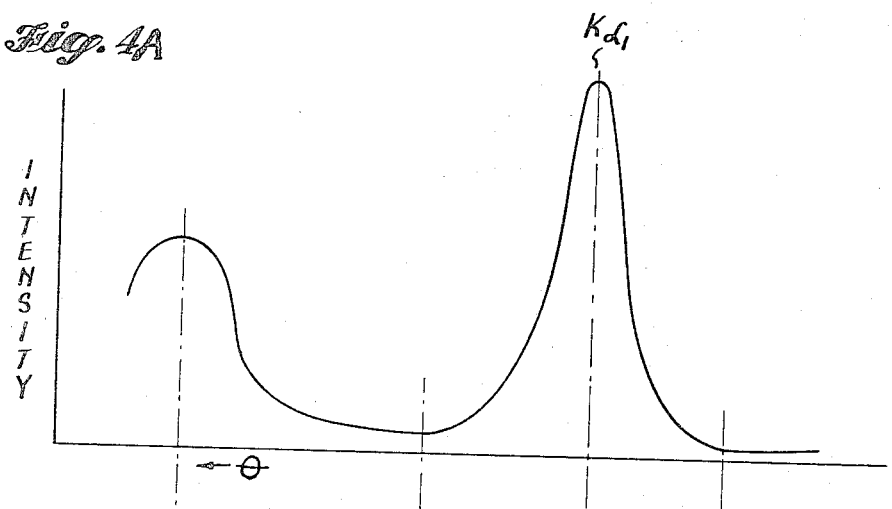
FIGURE 4A is a graph of intensity vs. Bragg angle $\theta$ generated by a source of X-rays and illustrating a characteristic K series emission spectrum of an element such as copper.

Referring now to the drawings and in particular to FIGURE 1 there is shown for purpose of illustration a conventional source of X-rays 10 adapted to provide a beam of X-rays 11. A crystal 12 adapted to have the space between adjacent atomic planes selectively altered is positioned at an angle $\theta$ with respect to the incident beam of X-rays. The crystal 12 may, for example, be a quartz crystal cut parallel to the [11$\bar{2}$0] plane and having a pair of metallic electrodes 13 and 14 evaporated on the front and back thereof. In practice the electrodes 13 and 14 are very thin but are shown enlarged in FIGURE 1 for teaching the invention. The assembly including the crystal 12 and associated electrodes 13 and 14 is advantageously embedded in a block of material such as Lucite and held in position on the head of a device such as the goniometer 15 so that the crystal 12 can be moved to a selected angle $\theta$ with respect to the X-ray beam 11. The electrodes 13 and 14 are coupled by leads 17 and 18 to an alternating current (A.C.) signal source 19 which can be any one of a number well known in the art and adapted to provide an alternating current signal to the electrodes 13 and 14 so that the crystal will be subjected to an alternating electric field. The signal source 19 is also coupled by leads 21 and 22 to a lock-in amplifier 23. The lock-in amplifier 23, which is per se well known in the art, is adapted to be primarily responsive to A.C. signals which are in phase with and at the frequency of a control signal applied to the amplifier. In the embodiment of the invention shown in FIGURE 1 the master or control signal to which the lock-in amplifier 23 "locks-on" is the signal from the signal source 19. A conventional X-ray detector 24 is positioned in the beam of X-rays 25 diffracted by the crystal 12. The detector 24 can, for example, be of the ionization type which is adapted to provide output signals on the leads 26 and 27 to the input circuitry of the lock-in amplifier 23. As is well known in the art, the amplitude of the signals provided by the detector 24 will be proportional to the intensity of the X-radiation received by the detector 24. A recorder 28 is coupled by leads 29 and 30 to the lock-in amplifier 23 for recording output signals from the lock-in amplifier.

It is well known in the art that when the target electrode in the X-ray source is made from a given material, as for example copper, the X-rays resulting from electron bombardment of the target will provide a continuous spectrum of frequencies having certain high intensity peaks referred to as the characteristic X-radiation for the element. There is shown for purpose of illustration in FIGURE 4A a representation of a portion of a K line X-ray spectrum for copper and including the peak corresponding to $K_{\alpha 1}$. When the X-rays are diffracted from a crystal such as that shown in FIGURE 1 maximum reinforcement will take place when the following relationship exists between the angle $\theta$, the separation $d$ between adjacent interatomic planes in the crystal, and the wavelength $\lambda$ of the X-rays:

$$n\lambda = 2d \sin \theta \qquad (1)$$

where $n$ equals 1, 2, 3, etc., corresponding to reflections from various parallel planes in the crystal. From Equation 1 above, referred to as the Bragg equation, it will be seen that $\lambda$ is proportional to $\theta$ and thus a graph of intensity of the reflected rays versus the angle $\theta$ serves as a convenient technique for ascertaining the wavelength $\lambda$ of the rays and hence identification of the source. Thus some prior art X-ray spectrometers include a crystal mounted on a goniometer head and rotated through various angles, with a record being made of the relative intensity of the reflected X-ray beam so that a characteristic curve such as that shown in FIGURE 4A is obtained and hence the composition of the X-ray target ascertained. It has been difficult in the past to obtain an exact determination of where the peak of the intensity curve has occurred, due in part to background noise.

Figure 4B:
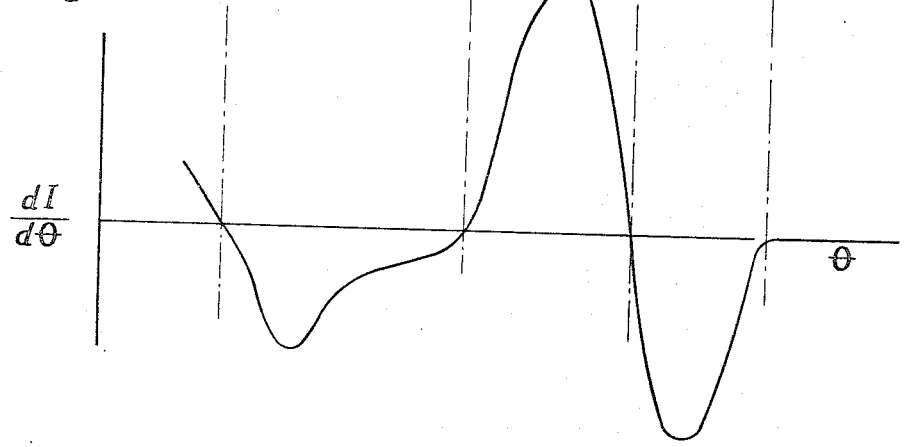
FIGURE 4B is a graph illustrating the level of the output signals from the lock-in amplifier of FIGURE 1 for the K series spectrum of FIGURE 4A.

In the system shown in FIGURE 1 the exact location of the characteristic peaks is readily ascertained and thus accurate material identification is possible. When the piezoelectric crystal 12 of FIGURE 1 is subjected to the varying electric field provided by the signal source 19 the quantity $d$ in the above Equation 1 is rapidly varied at each setting of $\theta$. Therefore the wavelength of the reinforcing diffracted X-rays 25 impinging on the detector 24 is scanned back and forth over a very small portion of the characteristic curve. As a result the output signals from the detector 24 are varied at the same frequency as the frequency of the signals applied to the crystal with amplitude of such signals from the detector being dependent on the slope of the characteristic curve. That is, when the spacing $d$ is altered with the angle $\theta$ corresponding to a steep portion of the characteristic curve, a small change in $d$ produces a substantial change in the intensity (or amplitude) of the signal from the detector. As the peak of the characteristic curve is approached to the point where the variation in $d$ causes the wavelength $\lambda$ to pass through the peak, the frequency of the A.C. component of the signal from the detector becomes twice the frequency of the signals from source 19, and then becomes either 180° out of phase with respect to the signals from the source 19 or of zero amplitude when the crystal is at the exact angle $\theta$ corresponding to the peak of the curve, depending upon the width of the peak and the variation in $d$ taking place. In either case since the amplifier 23 is sensitive only to A.C. signals from the detector 24 which are in phase with and at a frequency corresponding to the frequency of the signal generator 19, it is found in practice that the amplitude of the signal from the lock-in amplifier 23 goes to zero when the angle $\theta$ corresponds to a peak of the characteristic curve. The amplifier 24 thus in effect provides output signals on leads 29 and 30 which correspond to the first derivative of the characteristic curve shown in FIGURE 4A. For purpose of illustration the output signals from the lock-in amplifier 23 of the apparatus of FIGURE 1 used with a target electrode having the characteristic curve of FIGURE 4A is shown in FIGURE 4B. In FIGURE 4B it will be seen that the amplitude of the output signal from the lock-in amplifier 23 is proportional to the slope of the curve in FIGURE 4A. As the angle $\theta$ is changed by operation of the goniometer 15 (which may be done automatically) the slope of the characteristic curve changes as well as the absolute intensity. However since the lock-in amplifier responds only to the A.C. signals resulting from the changing atomic plane spacing $d$ in Equation 1, background noise is effectively eliminated and the slope of the curve is ascertained. Thus when the curve of FIGURE 4A is exactly at a peak the slope becomes zero and the curve of FIGURE 4B crosses its zero axis. Therefore an accurate indication of the angle at which the crystal is oriented for occurrence of the characteristic peak such as $K\alpha_1$ in FIGURE 4A is readily obtained. The signals from amplifier 23 are applied to the recorder 28 so that a permanent record is obtained, but of course a meter or other device such as an oscilloscope can be used for visual observance of when the angle $\theta$ corresponds to a peak of the characteristic curve. In practice the recorder may be used to simultaneously record $\theta$ and the signals from the lock-in amplifier.

In the embodiment of FIGURE 2 the lock-in amplifier is replaced by a band-pass filter network 30 and an A.C. amplifier 31. In the embodiment of FIGURE 2 the material being investigated is in the form of a sample 32 placed between the detector 24 and the crystal 12 with the characteristic absorption by the sample serving as identification. With the arrangement of FIGURE 2 the maximum output signal from the amplifier 31 corresponds to the crystal 12 being so oriented that the reflected wavelength corresponds to an absorption edge for an element in the sample. It will be seen that the apparatus of FIGURE 1 as well as that of FIGURE 2 can be used for identifying the elements in a sample either by absorption or emission techniques. It should be noted that the system of FIGURE 1 provides an advantage over that of FIGURE 2 in that in the system of FIGURE 1 frequency and phase discrimination takes place for reducing the effect of noise whereas in the system of FIGURE 2 only frequency discrimination takes place. However both systems provide a substantial improvement over existing spectrometers since the usual constant intensity background noise is eliminated.

If a primary beam of X-rays is directed onto a piece of material fluorescent X-rays will be produced having wavelengths corresponding to the wavelengths which would be emitted if the material were used as the target electrode in a cathode ray tube. In a similar manner the bombardment of the surface of a piece of material by a small diameter stream of electrons will cause fluorescent radiation to be generated. In each case it is found that the X-rays produced by fluorescent radiation can be detected above the surface being bombarded or irradiated so that by analysing the fluorescent radiation with a spectrometer the composition of the surface can be ascertained. The teachings of the present invention are well adapted to such techniques for enhancing the accuracy of such systems.

Referring now to FIGURE 3 there is shown for purpose of illustration an electron microprobe apparatus incorporating the teachings of the present invention to provide an improved system for obtaining information regarding the surface of a piece of material. An electron source 40 provides a beam of electrons 41 with the beam being directed against the surface of the material 42 under investigation. The source 41 may for example be adapted to provide a very small diameter beam of approximately 1 micron diameter so that a very small area of the surface of the material 42 is bombarded at any time. The electrons are preferably in the 100 kilo volt energy range so that the various elements in the surface of the material will generate their characteristic fluorescent radiation shown generally as the X-ray beam 41A. While the fluorescent radiation would in practice be emitted in various directions only that portion used for purpose of analysis is shown in FIGURE 3, and in practice appropriate shielding is provided so that only the desired beam 41A is obtained. The X-ray beam 41A is directed against the crystal 12 which is part of a system identical to that of FIGURE 1 with similar parts bearing the same reference numerals as in FIGURE 1. The angle $\theta$ is set to correspond to the critical angle for reinforcing diffraction and reflection for X-rays of a wavelength corresponding to a characteristic wavelength for a given element. The output signal from the lock-in amplifier will thus provide an indication of whether or not that selected wavelength is being emitted from the area under investigation. Thus the presence or absence of the element having that selected characteristic fluorescent radiation wavelength is ascertained. By providing relative movement between the material 42 and the electron source 40, with the crystal supporting goniometer stationary with respect to the source 40, the entire surface of the material 42 can be scanned. Thus a "map" of the surface is obtained with information regarding the composition of each spot on the surface being obtained. The material 42 is shown as being carried by a holder 43 slideable on the support bar 44 carried on movable block 45 which is in turn supported by bar 46. A first drive motor 47 and threaded shaft 48 carried by bar 44 are operable for adjustment of the material in one direction while a second motor 49 and threaded shaft 50 are operable for adjustment of the material 42 is a second direction opposite to said first direction. The motor control units 51 and 52 respectively associated with motors 47 and 49 are preferably preprogrammed to cause movement of the material 42 for scanning thereof by the beam 41 in a selected pattern. It will be seen that by using the apparatus of FIGURE 1 for controlling the crystal 12 and eliminating various noises, an extremely accurate system is provided for obtaining data regarding the presence or absence of as well as location of selected elements in the surface of a given piece of test material.

There has thus been disclosed an improved and highly sensitive X-ray spectrometer. While the invention has been described by reference to specific preferred embodiments, it is intended that such changes and modifications as will be obvious to a person skilled in the art from the teachings hereof will be encompassed by the following claims.

What is claimed is:

1. A spectrometer comprising in combination: a crystal; signal means coupled with said crystal for applying excitation signals thereto of a nature to vary the spacing of atomic planes within said crystal; radiation detector means positioned to receive X-rays reflected from said crystal; and frequency sensitive signal output means including an amplifier coupled with said detector means and with said signal means and responsive primarily to signals from said detector means at the frequency of said excitation signals.

2. A spectrometer in accordance with claim 1 wherein said crystal is a piezoelectrical crystal.

3. An X-ray analysis apparatus comprising in combination: a diffraction member having selectively variable lattice spacing; alternating current signal means coupled with said member adapted to alter the lattice spacing within said member at a first frequency; X-ray detector means positioned to receive X-rays reflected by said member; and a lock-in amplifier having a control circuit coupled with said signal means and a signal input circuit coupled with said detector means and adapted to provide output signals proportional to signals received from said detector means.

4. A spectrometer comprising in combination: diffraction means defining a plurality of substantially parallel reflecting planes and responsive to an applied signal to undergo a change in the spacing between adjacent planes; support means holding said diffraction means at a selected angle with respect to a beam of X-rays to be analyzed; alternating signal means coupled with said diffraction means for applying signals thereto for altering the spacing of said planes; detector means positioned to receive X-ray energy reflected from said planes; and signal amplifier means coupled with said detector means and with said signal means and responsive only to signals from said detcetor means at the frequency of said signals applied to said diffraction means by said signal means.

5. A spectrometer in accordance with claim 4 wherein said signal amplifier is responsive only to signals from said detector means which are in phase with and at the frequency of the said signals applied to said diffraction means by said signal means.

6. An X-ray spectrometer comprising in combination: a piezoelectric crystal; support means holding said crystal at selected angles with respect to an X-ray beam; an alternating current signal source coupled with said crystal for applying an alternating electric field to said crystal at a first frequency; an X-ray detector positioned to receive X-rays reflected from said crystal; signal amplifier means coupled with said detector and with said signal source and adapted to amplify only those signals from said detector which are in phase with and at the frequency of said signals applied to said crystal; and recorder means coupled with said amplifier means.

7. An apparatus for analyzing the surface of a piece of material comprising in combination: electron means adapted to direct a beam of electrons against a small area of said material with sufficient energy to cause the emission of characteristic fluorescent X-radiation by atoms within said area; diffraction means having variably spaced X-ray reflecting means; means positioning said diffraction means at a selected angle with respect to said material; alternating signal means coupled with said diffraction means and adapted to alter the spacing of said reflecting means in said diffraction means at a first frequency; detector means positioned to receive X-radiation from said diffraction means; and frequency sensitive signal amplifier means coupled with said detector means and with said signal means adapted to amplify only signals of said first frequency received from said detector means.

References Cited

UNITED STATES PATENTS

| 2,476,150 | 7/1949 | Koppius | 250—51.5 |
| 2,610,301 | 9/1952 | Hansen | 250—51.5 |
| 3,103,584 | 9/1963 | Shapiro et al. | 250—49.5 |

WILLIAM F. LINDQUIST, *Primary Examiner.*

RALPH G. NILSON, *Examiner.*